US008157684B2

(12) United States Patent
Ito

(10) Patent No.: US 8,157,684 B2
(45) Date of Patent: Apr. 17, 2012

(54) BELT DRIVING APPARATUS AND IMAGE FORMING APPARATUS THAT USES THE BELT DRIVING APPARATUS

(75) Inventor: Michiaki Ito, Tokyo (JP)

(73) Assignee: Oki Data Corporation, Tokyo (JP)

( * ) Notice: Subject to any disclaimer, the term of this patent is extended or adjusted under 35 U.S.C. 154(b) by 877 days.

(21) Appl. No.: 11/050,693

(22) Filed: Feb. 7, 2005

(65) Prior Publication Data

US 2005/0176540 A1 Aug. 11, 2005

(30) Foreign Application Priority Data

Feb. 6, 2004 (JP) ................................ 2004-030494

(51) Int. Cl.
*F16G 1/00* (2006.01)

(52) U.S. Cl. ....................................... 474/237; 474/259

(58) Field of Classification Search .................. 474/237, 474/259
See application file for complete search history.

(56) References Cited

U.S. PATENT DOCUMENTS

| | | | | |
|---|---|---|---|---|
| 3,327,839 | A * | 6/1967 | Arnold et al. | 198/835 |
| 5,017,969 | A * | 5/1991 | Mitomi et al. | 399/299 |
| 5,369,477 | A * | 11/1994 | Foote et al. | 399/102 |
| 6,192,210 | B1 * | 2/2001 | Munenori et al. | 399/165 |
| 6,330,404 | B1 * | 12/2001 | Munenaka et al. | 399/51 |
| 6,561,344 | B1 * | 5/2003 | Basse | 198/844.1 |
| 2003/0081964 | A1 * | 5/2003 | Shimura et al. | 399/121 |
| 2004/0009420 | A1 * | 1/2004 | Sugahara et al. | 430/108.1 |

FOREIGN PATENT DOCUMENTS

| | | |
|---|---|---|
| FR | 2771021 A1 * | 5/1999 |
| JP | 6-256587 | 9/1994 |
| JP | 07-187435 | 7/1995 |
| JP | 9-175617 | 7/1997 |
| JP | 2000-062993 | 2/2000 |
| JP | 2000-289822 | 10/2000 |

* cited by examiner

*Primary Examiner* — Bradley King
*Assistant Examiner* — Mahbubur Rashid
(74) *Attorney, Agent, or Firm* — Rabin & Berdo, P.C.

(57) ABSTRACT

A belt is entrained about the rollers. A belt guide is secured to an inner surface of the belt and is guided by pulleys. The belt guide is formed of a material that has a dissipation factor of tan $\delta \geqq 0.05$ at a resonance frequency of 1 Hz±10% and at a temperature of 50±0.5° C., and a storage modulus of $E' \geqq 8.0 \times 10^6$ (Pa) at a resonance frequency of 1 Hz±10% and at a temperature of 50±0.5° C. Another material has tan $\delta \geqq 0.05$ at 1 Hz±10% and at 50±0.5° C., and $E' \geqq 8.0 \times 10^6$ (Pa) at 1 Hz±10% and at 50±0.5° C. The belt guide may be formed of a plurality of layers.

13 Claims, 3 Drawing Sheets

BELT DRIVING APPARATUS AND IMAGE FORMING APPARATUS THAT USES THE BELT DRIVING APPARATUS

BACKGROUND OF THE INVENTION

1. Field of the Invention

The present invention generally relates to a belt-driving apparatus for driving an endless belt that is used in an intermediate transfer unit, a transfer-and-separation unit, a transport unit, charging unit and a developing unit for electrophotographic copying machines and printers, and an image forming apparatus that uses the belt-driving apparatus.

2. Description of the Related Art

A conventional tandem type electrophotographic image-forming apparatus uses a belt unit that transports a medium on which an image is transferred by an electrophotographic process. This type of belt tends to snake. For this reason, a projected guide is provided on an inner surface of the endless belt for preventing the belt from snaking. The belt runs with the projected guide received in a pulley, so that the belt runs without snaking. The belt guide is formed of a reinforcing material having a tensile modulus of more than 5,000 kg/cm$^2$, a layer of adhesive having a thickness in the range of 5 to 100 μm, and a material having a hardness in the range of 30 to 95 Hs (JISA) bonded to the layer of adhesive.

The aforementioned conventional apparatus suffers from the problem that the endless belt comes off the belt guide or the belt guide may break.

SUMMARY OF THE INVENTION

An object of the invention is to solve the aforementioned problems with the conventional fixing unit.

An object of the invention is to provide a belt guide for a pulley that has a long life and maintains its tensile modulus at high temperature.

A belt driving apparatus includes rollers, a belt, and a belt guide. The belt is entrained about the rollers. The pulley is rotatably mounted to at least one of the rollers. The belt guide is secured to an inner surface of the belt and is guided by the pulley. The belt guide is formed of a material that has a dissipation factor of tan $\delta \geqq 0.05$ at a resonance frequency of 1 Hz±10% and at a temperature of 50±0.5° C., and a storage modulus $E' \geqq 8.0\times10^6$ (Pa) at a resonance frequency of 1 Hz±10% and at a temperature of 50±0.5° C.

The belt guide may be formed of a plurality of layers.

The belt guide may be stamped from a sheet of material and a convex surface of the belt guide is bonded to the belt.

An image forming apparatus incorporates the aforementioned belt driving apparatus.

The belt guide may formed of a material that has a dissipation factor of tan $\delta \geqq 0.08$ at a resonance frequency of 1 Hz±10% and at a temperature of 10±0.5° C., and a storage modulus $E' \geqq 8.7\times10^6$ (Pa) at a resonance frequency of 1 Hz±10% and at a temperature of 10±0.5° C.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein.

DETAILED DESCRIPTION OF THE INVENTION

First Embodiment

{Construction}

Figure 1:
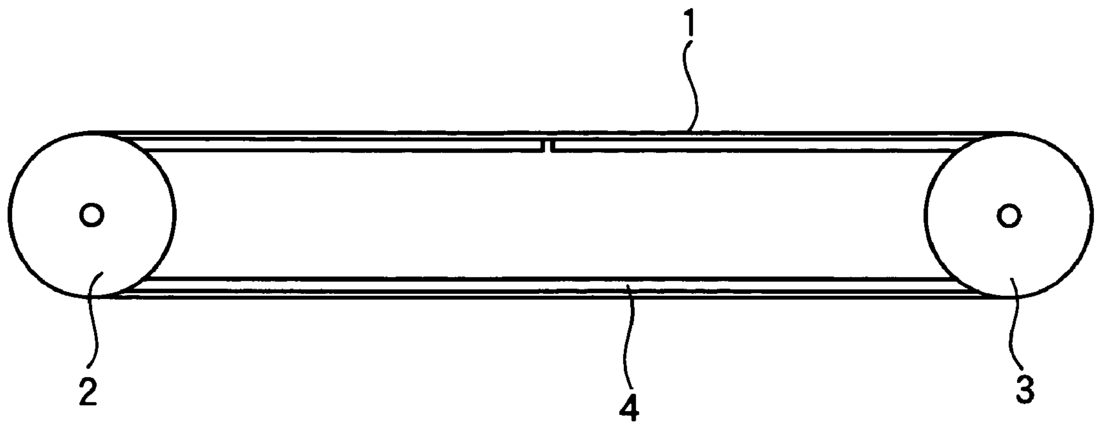
FIG. 1 is a schematic side view illustrating a transfer belt according to a first embodiment.

FIG. 1 is a schematic side view illustrating a transfer belt according to a first embodiment.

Figure 2:
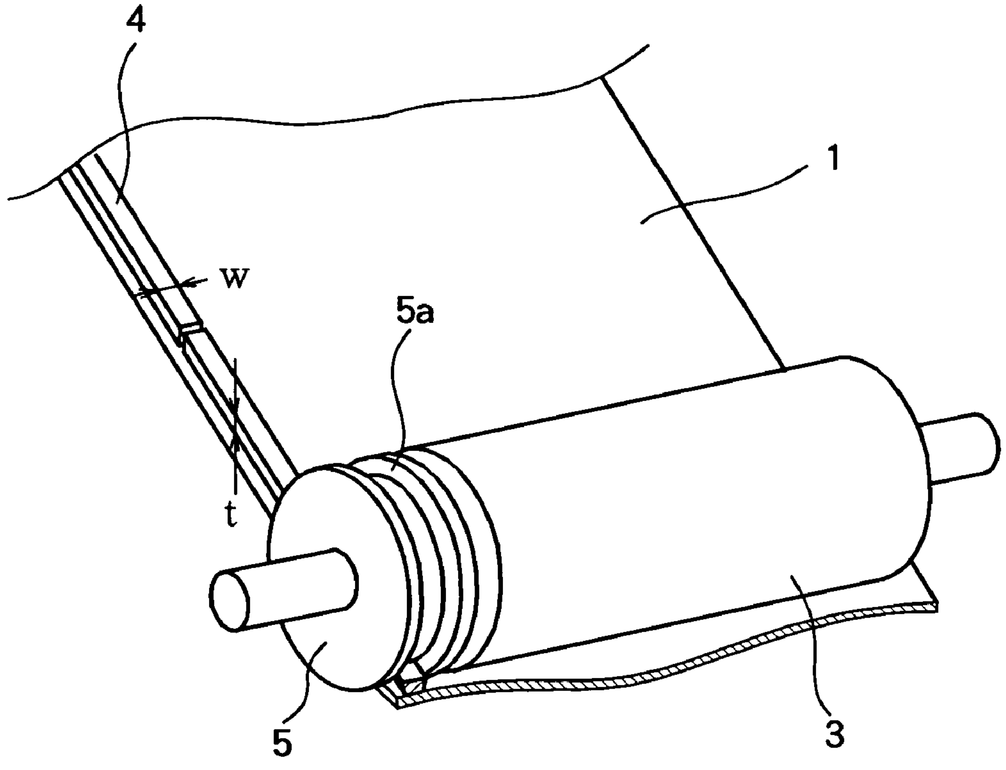
FIG. 2 is a perspective view illustrating an outline of the belt according to the first embodiment, the belt being shown in a cut away view.

FIG. 2 is a perspective view illustrating an outline of the belt according to the first embodiment, the belt being shown in a cut away view.

Referring to FIG. 1 and FIG. 2, the transfer belt 1 is entrained about a drive roller 2 and a driven roller 3 under a predetermined tension, so that when the drive roller 2 rotates, the driven roller 3 rotates and a transfer belt 1 runs. By using SUPER-X available from CEMEDINE, a belt guide 4 is bonded to one widthwise end portion of the transfer belt 1 and extends along the loop-like inner surface of the transfer belt 1. The belt guide 4 has a width W of 5 mm and a thickness t of 1 mm. A pulley 5 is concentric with the driven roller 3 and is mounted near the driven roller 3 such that the pulley 5 is rotatable independently of the driven roller 3. The pulley 5 guides the belt guide 4, while also being limited in its axial movement.

The belt guide 4 has a dissipation factor of tan $\delta \geqq 0.05$ and a storage modulus of $E' \geqq 8.0\times10^6$ (Pa). These physical quantities are measured in a furnace at a temperature of 50±0.5° C. and a resonance frequency of 1 Hz±10%. The measurement was made according to JISK7244-4 (Determination of Dynamic Mechanical Properties of plastics, Part 4: Tensile Vibration—Non-resonance Method). The transfer belt 1 is formed of, for example, polyimide or polyamide that is effective in transferring visible images and attracting a recording medium M, and has good durability. The belt guide 4 is formed of, for example, urethane rubber that shows good resistance to fatigue and resistance to wear. The belt guide 4 may be a laminated structure in which a tough material such as polyethylene terephthalate (PET) or polypropylene is laminated for reinforcement. The belt guide 4 may also be made of any material provided that the aforementioned physical characteristics can be obtained. The temperature in the furnace is increased from −70° C. to +100° C. at a rate of 10° C./minute and the respective physical values are measured at 50° C.

Figure 3:
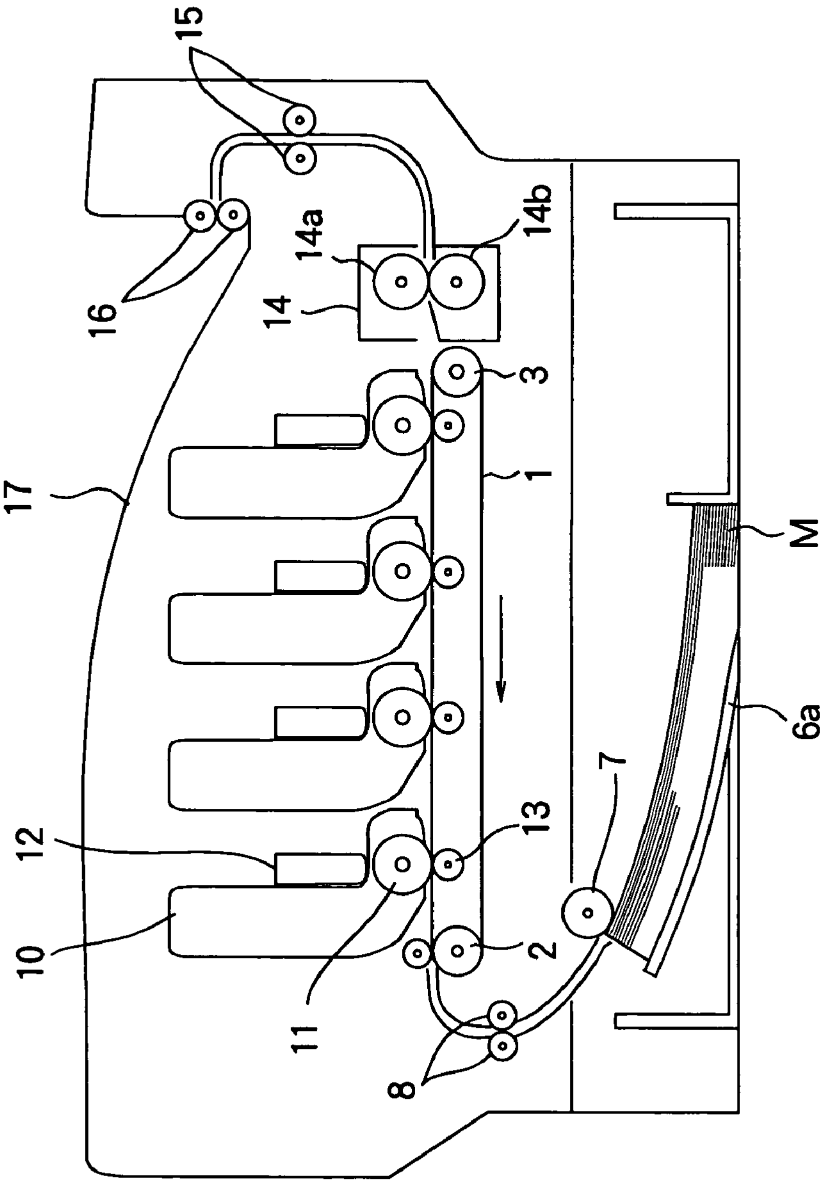
FIG. 3 is a schematic view of an image forming apparatus that is equipped with the transfer belt according to the first embodiment.

FIG. 3 is a schematic view of an image forming apparatus that is equipped with the transfer belt according to the first embodiment. The image forming apparatus will be described with reference to FIG. 13. A paper cassette 6 holds a stack of recording medium M. The hopping roller 7 rotates to feed the recording medium M on a page-by-page basis. A push-up plate 6*a* pushes up the stack of recording medium M from bottom, so that the top page of the front half of the stack is urged against the hopping roller 7. A pair of registry rollers 8 transports the recording medium M to the first one of the respective image forming sections 10 that include a photoconductive drum 11 and exposing unit 12. The transfer belt 1 supports the recording medium M on its outer surface and runs through the respective image forming sections while being sandwiched between the photoconductive drums 11 and transfer rollers 13. After having passed through the final image forming section, the recording medium M advances to a fixing unit 14 that includes a heat roller 14*a* and a pressure roller 14*b*. The recording medium M is pulled in between the heat roller 14*a* and the pressure roller 14*b*, so that the toner image on the recording medium M is fixed into a permanent image. Then, the recording medium M leaves the fixing unit 14, is transported by a pair of transport rollers 15, and is finally discharged onto a discharge tray 17 and a pair of discharge rollers 16.

The operation of the image forming apparatus will be described. The drive roller 2 is supported on a support, not shown, on the image forming apparatus side and is driven in rotation by a drive source, not shown. When the drive roller 2 rotates, the transfer belt 1 rotates to cause the driven roller 3 to rotate. At this moment, the groove formed in the pulley 5 guides the belt guide 4 provided on the transfer belt 1, so that the transfer belt 1 can run without shifting in a direction of the rotational axis of the drive roller 2.

The printing operation of the image forming apparatus will be described. The push-up plate 6*a* pushes up the bottom of the stack of recording medium M accommodated in the paper cassette 6, so that the top page of the stack is urged against the hopping roller 7. The hopping roller 7 rotates to feed the recording medium M on a page-by-page basis. The thus fed recording medium M is transported by registry rollers 8 to a transfer point defined between the transfer belt 1 and the image forming section 10.

At the image forming section 10, the light-emitting elements of the exposing unit 12 are selectively energized in accordance with image data to irradiate the charged surface of the photoconductive drum 11 with light, thereby forming an electrostatic latent image on the photoconductive drum 11. A toner-supplying roller, not shown, is formed of, for example, urethane sponge an supplies toner, not shown, from a toner cartridge, not shown, to a developing member, not shown. The toner on the developing member is formed into a thin layer by a developing blade, not shown, and supplied to the electrostatic latent image on the photoconductive drum 11. The transfer roller 13 receives a predetermined voltage so that the toner image on the photoconductive drum 11 is transferred onto the recording medium M by the Coulomb force created across the photoconductive drum 11 and the transfer roller 13. The recording medium M remains attracted to the transfer belt 1 and passes through the respective image forming sections 10 in sequence so that the aforementioned transfer operation is repeated in sequence. The transfer belt 1 runs to transport the recording medium M having the toner images thereon to the fixing unit 14.

The fixing unit 14 includes the heat roller 14*a* having the heat source therein and the pressure roller 14*b* that is pressed against the heat roller 14*a* under a predetermined pressure. The heat roller 14*a* and pressure roller 14*b* are vertically aligned and rotate in opposite directions. The recording medium M is pulled in between the heat roller 14*a* and pressure roller 14*b* and subjected to heat so that the toner on the recording medium M is fused into a permanent image. The recording medium M is then further transported by the transport rollers 15 and is discharged by the pair of discharge rollers 16 onto the discharge tray 17.

TABLE 1

| | | | MATERIAL #1 | MATERIAL #2 | MATERIAL #3 | MATERIAL #4 | MATERIAL #5 |
|---|---|---|---|---|---|---|---|
| 1 Hz | 10° C. | E' (Pa) | $5.80 \times 10^6$ | $8.70 \times 10^6$ | $2.50 \times 10^7$ | $3.00 \times 10^7$ | $3.50 \times 10^7$ |
| | | tan δ | 0.07 | 0.08 | 0.09 | 0.2 | 0.35 |
| | 50° C. | E' (Pa) | $5.40 \times 10^6$ | $8.0 \times 10^6$ | $2.20 \times 10^7$ | $2.00 \times 10^7$ | $2.00 \times 10^7$ |
| | | tan δ | 0.04 | 0.05 | 0.05 | 0.08 | 0.10 |
| EVALUATION | | | Cracking and climbing occurred at 50,000 pages | good for 80,000 pages | good for 80,000 pages | good for 80,000 pages | good for 80,000 pages |

Experiment was performed for various guide members for detecting whether cracking of the transfer belt 1 occurs. Table 1 lists the test results. An image forming apparatus in FIG. 3 was placed on a flat bench. A spacer having a thickness of 10 mm was inserted under the front left corner of the image forming apparatus so that the image forming apparatus is distorted. This experiment was conducted to determine whether the belt guide 4 bonded to the transfer belt 1 runs over the pulley 5. Due to the distortion of the image forming apparatus, the transfer belt 1 is lifted at the opposite end of the driven roller 3 from the pulley 5. By using guide materials #1, #2, #3, #4 and #5 assembled into the aforementioned image-forming apparatus, continuous printing was performed at a print duty of 5%, three consecutive pages for one printing job (intervals of more than ten seconds after printing three consecutive pages). The tests were performed in accordance with JISK7244-4, i.e. at a resonance frequency of 1 Hz±10% and a furnace temperature of 50±0.5° C. and 10±0.5° C., thereby determining whether the transfer belt 1 cracks due to stress.

Guide material #1 has a dissipation factor of tan δ=0.04 and a storage modulus of E'=$5.40\times10^6$ (Pa) at 50° C. and tan δ=0.07 and E'=$5.80\times10^6$ (Pa) at 10° C.

Guide material #2 has a dissipation factor of tan δ=0.05 and a storage modulus of E'=$8.00\times10^6$ (Pa) at 50° C. and tan δ=0.08 and E'=$8.70\times10^6$ (Pa) at 10° C.

Guide material #3 has a dissipation factor of tan δ=0.05 and a storage modulus of E'=$2.20\times10^6$ (Pa) at 50° C. and tan δ=0.09 and E'=$2.50\times10^7$ (Pa) at 10° C.

Guide material #4 has a dissipation factor of tan δ=0.08 and a storage modulus of E'=$2.00\times10^7$ (Pa) at 50° C. and tan δ=0.2 and E'=$3.00\times10^7$ (Pa) at 10° C.

Guide material #5 has a dissipation factor of tan δ=0.10 and a storage modulus of $E'=2.00\times10^7$ (Pa) at 50° C. and tan δ=0.35 and $E'=3.50\times10^7$ (Pa) at 10° C.

The results in Table 1 reveal that guide material #1 cracks after printing about 50,000 pages and guide materials #2-#5 do not crack after printing 80,000 pages (after the end of the lifetime of the transfer belt 1). Due to snaking motion of the transfer belt 1 during printing, the belt 4 is subjected to a shearing force. Guide materials #2-#5 are considered to be resistant to shearing force exerted on the belt guide 4 because they do not lose their tensile modulus at an internal high temperature of 50° C. in the image forming apparatus.

The use of the belt guide 4 according to the first embodiment prevents the problem otherwise be encountered if the conventional belt guide is used, i.e., first embodiment prevents the transfer belt 1 from cracking and the belt guide 4 from running over the pulley 5. The first embodiment allows smooth running of the belt without losing the ability of the belt guide 4 to prevent the transfer belt 1 from snaking. This ensures long life of a transfer belt and good print results with little or no poor transferring of toner images over time.

Second Embodiment

Figure 4:
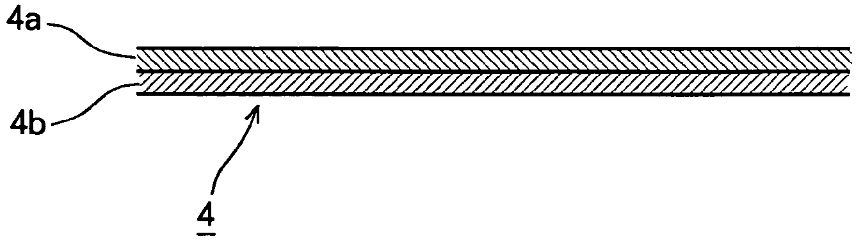
FIG. 4 is a cross-sectional view illustrating the general configuration of a belt guide according to a second embodiment.

FIG. 4 is a cross-sectional view illustrating the general configuration of a belt guide 4 according to a second embodiment. The belt guide 4 has a laminated structure of a layer 4*a* and a layer 4*b*. The layer 4*a* is formed of urethane rubber that shows good resistance to fatigue and good resistance to wear. The layer 4*b* includes, for example, urethane rubber on which a reinforce material such as polyethylene terephthalate (PET) and polypropylene is laminated. The material for the belt guide 4 is not limited to these and the number of layers is not limited to two.

The thus formed belt guide has a dissipation factor of tan δ≧0.05 and a storage modulus of $E'\geqq8.0\times10^6$ (Pa). These physical quantities are obtained at a furnace temperature of 50±0.5° C. and a resonance frequency of 1 Hz±10%. The measurement was made according to JISK7244-4 (Determination of Dynamic Mechanical Properties of plastics, Part 4: Tensile Vibration—Non-resonance Method). The rest of the configuration is the same as those in the first embodiment and the description thereof is omitted.

TABLE 2

| CHARACTERISTICS | MATERIAL #6 | MATERIAL #7 | MATERIAL #8 |
|---|---|---|---|
| STORAGE MODULUS E' (Pa) | $5.40\times10^6$ | $1.80\times10^7$ | $9.60\times10^6$ |
| tan δ | 0.05 | 0.09 | 0.05 |
| EVALUATION | Cracking and climbing occurred at 50,000 pages | good for 80,000 pages | good for 80,000 pages |

At 1 Hz, 50° C.

Continuous printing was performed for various guide members #6, #7, and #8 to determine whether the transfer belt 1 cracks. Table 2 lists the test results. An image forming apparatus was placed on a flat bench. A spacer having a thickness of 10 mm was inserted under the front left corner of the image forming apparatus so that the image forming apparatus is distorted. This experiment was conducted to determine whether the belt guide 4 bonded to the transfer belt 1 runs over the pulley 5. Due to the distortion of the image forming apparatus, the transfer belt 1 is lifted at the opposite end of the driven roller 3 from the pulley 5. By using guide materials #6, #7, and #8 assembled into the aforementioned image-forming apparatus, continuous printing was performed at a print duty of 5%, three consecutive pages for one printing job (intervals of more than ten seconds after printing three consecutive pages). The tests were performed in accordance with JISK7244-4, i.e., at a resonance frequency of 1 Hz±10% and a furnace temperature of 50±0.5° C., thereby determining whether the transfer belt 1 cracks due to stress.

Guide material #6 has a dissipation factor of tan δ=0.04 and a storage modulus of $E'=5.40\times10^6$ (Pa). Guide material #7 has a dissipation factor of tan δ=0.05 and a storage modulus of $E'=1.80\times10^7$ (Pa). Guide material #8 has a dissipation factor of tan δ=0.05 and a storage modulus of $E'=9.60\times10^6$ (Pa).

The results in Table 2 reveal that guide material #6 cracks after printing about 50,000 pages and guide materials #7 and #8 do not crack after printing 80,000 pages (i.e., after the end of the lifetime of the transfer belt 1). Due to the snaking motion of the transfer belt 1 during printing, the belt guide 4 is subjected to a shearing force. Guide materials #6 and #7 are considered to be resistant to the shearing force exerted on the belt guide 4 because they do not lose their tensile modulus at an internal high temperature of 50° C. in the image forming apparatus.

As described above, a plurality of materials are laminated to form the belt guide 4. Thus, in addition to the advantages of the first embodiment, the use of the belt guide 4 provides an advantage that materials having a good bonding property may be combined. In addition, the ability of the belt guide 4 to slide on the pulley 5 is improved so that stable running of the belt guide is ensured.

Third Embodiment

The operation of a third embodiment is the same as that in the first embodiment and therefore the description thereof is omitted. The third embodiment will be described with reference to Table 3. By using the same stamping press used for stamping the belt guide, the same sheet of material as guide material #1 was stamped out to form a total of six guide materials #1. Each of the six guide materials #1 were bonded to the transfer belt 1 to prepare six test belts B1-B6. Likewise, the same sheet of material as guide material #2 was stamped out to form a total of six guide materials #2, and each of the six guide materials #2 was bonded to the transfer belt 1 to prepare six test belts N1-N6. A 180-degree peel strength test was performed for six test belts B1-B6 that use the six guide materials #1 and six test belts N1-N6 that use the six guide materials #2. The peel rate was 300 mm/min. The materials were bonded using Super-X available from CEMEDINE. Table 3 lists the test results. The values in Table 3 are in kgf, which is defined as a force that acts on a 5-mm width.

TABLE 3

| TEST BELTS N | GUIDE MATERIAL #1 | GUIDE MATERIAL #2 |
|---|---|---|
| 1 | 0.780 | 0.738 |
| 2 | 0.790 | 0.500 |
| 3 | 0.688 | 0.298 |
| 4 | 0.788 | 0.439 |
| 5 | 0.742 | 0.546 |
| 6 | 0.760 | 0.646 |
| AVERAGE | 0.758 | 0.528 |
| STANDARD DEVIATION σ | 0.039 | 0.155 |

Figure 5A:
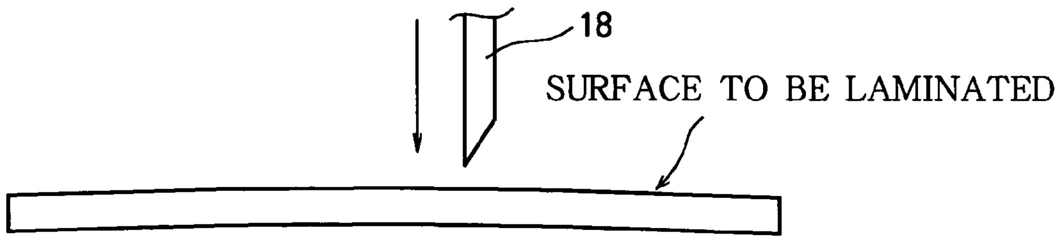
FIG. 5A is a side view.
Figure 5B:
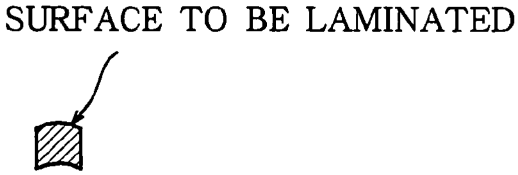
FIG. 5B is a cross-sectional view.

Continuous printing was performed for guide materials #1 and #2 to determine whether the transfer belt 1 cracks. Table 3 lists the test results. FIGS. 5A and 5B show the direction in which a cutting edge 18 cuts through the belt guides. FIG. 5A is a side view and FIG. 5B is a cross-sectional view. The values in Table 3 reveal that guide material #1 has a higher peel strength than guide material #2. This is due to the fact that the surface into which the cutting edge 18 cuts in is convex and the surface through which the cutting edge 18 cuts out is concave. In other words, a gap tends to be created between the concave surface and a surface to which the concave surface is to be bonded, so that air in the gap is difficult to escape from the gap and therefore bonding force tends to decrease. Conversely, air is easy to escape from the gap between the convex surface and a surface to which the convex surface is to be bonded, thereby increasing the bonding force. As is clear from the difference in standard deviation $\sigma$, variation in bonding effect is small when the convex surface is bonded. As described above, bonding the belt guide 4 to the transfer belt 1 in the method according to the third embodiment offers a high bonding force in addition to the advantages of the first embodiment. Thus, the third embodiment ensures stable running of the transfer belt. Further, the third embodiment may be combined with the belt guide 4 according to the second embodiment.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A belt driving apparatus, comprising:
- a plurality of rollers;
- a belt that is entrained about said plurality of rollers;
- a pulley that is rotatably mounted to at least one of said plurality of rollers;
- a belt guide that is secured to an inner surface of said belt and is guided by said pulley, said belt guide being formed of plastic having a dissipation factor of tan $\delta \geqq 0.05$ at a resonance frequency of 1 Hz±10% and at a temperature of 50±0.5° C., and storage modulus in the range of $2.2\times10^7 \geqq E' \geqq 8.0\times10^6$ (Pa) at a resonance frequency of 1 Hz±10% and at a temperature of 50±0.5° C.,
- wherein said belt guide is stamped from a sheet of material, a convex surface of said belt guide is bonded to said belt.

2. An image forming apparatus that incorporates the belt driving apparatus according to claim 1.

3. The belt driving apparatus according to claim 1, wherein said belt guide is formed of a plurality of layers.

4. The belt driving apparatus according to claim 3, wherein the plurality of layers includes a layer having resistance to fatigue and resistance to wear and a layer having toughness.

5. The belt driving apparatus according to claim 1, wherein the belt guide is comprised of urethane rubber.

6. The belt driving apparatus according to claim 3, wherein the plurality of layers include a first layer and a second layer, the first layer being comprised of urethane rubber, the second layer including urethane rubber on which a reinforce material is laminated.

7. The belt driving apparatus according to claim 6, wherein the reinforce material is at least one selected from the group consisting of polyethylene terephthalate (PET) and polypropylene.

8. The belt driving apparatus according to claim 1, wherein said belt guide includes a convex surface and a concave surface opposite to the convex surface, the convex surface being bonded to said belt.

9. A belt driving apparatus, comprising:
- a plurality of rollers;
- a belt that is entrained about said plurality of rollers;
- a pulley that is rotatably mounted to at least one of said plurality of rollers;
- a belt guide that is secured to an inner surface of said belt and is guided by said pulley, said belt guide being formed of plastic having a dissipation factor of tan $\delta \geqq 0.08$ at a resonance frequency of 1 Hz±10% and at a temperature of 10±0.5° C., and storage modulus of $E'' \leqq 3.5\times10^7$ (Pa) at a resonance frequency of 1 Hz±10% and at a temperature of 10±0.5° C.,
- wherein said belt guide is stamped from a sheet of material, a convex surface of said belt guide is bonded to said belt.

10. An image forming apparatus that incorporates the belt driving apparatus according to claim 9.

11. The belt driving apparatus according to claim 9, wherein said belt guide is formed of a plurality of layers.

12. The belt driving apparatus according to claim 11, wherein the plurality of layers includes a layer having resistance to fatigue and resistance to wear and a layer having toughness.

13. The belt driving apparatus according to claim 9, wherein the belt guide is comprised of urethane rubber.

* * * * *